Figure 1:
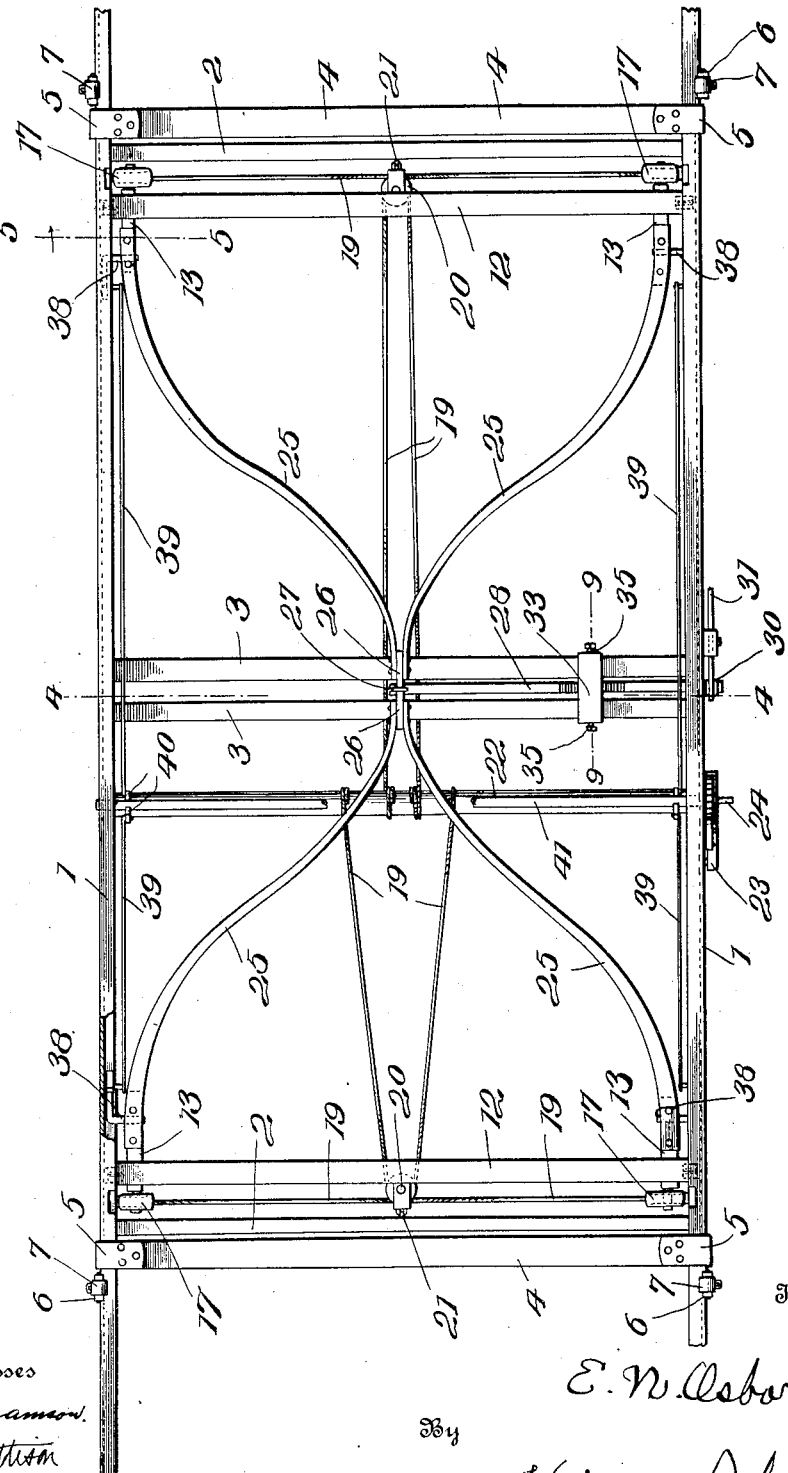

E. N. OSBORNE.
VEHICLE SCALE.
APPLICATION FILED APR. 26, 1913.

1,079,260.

Patented Nov. 18, 1913.
3 SHEETS—SHEET 1.

Witnesses

Inventor
E. N. Osborne
By
Hubert E. Peck, Attorney

E. N. OSBORNE.
VEHICLE SCALE.
APPLICATION FILED APR. 26, 1913.
1,079,260.
Patented Nov. 18, 1913.
3 SHEETS—SHEET 2.
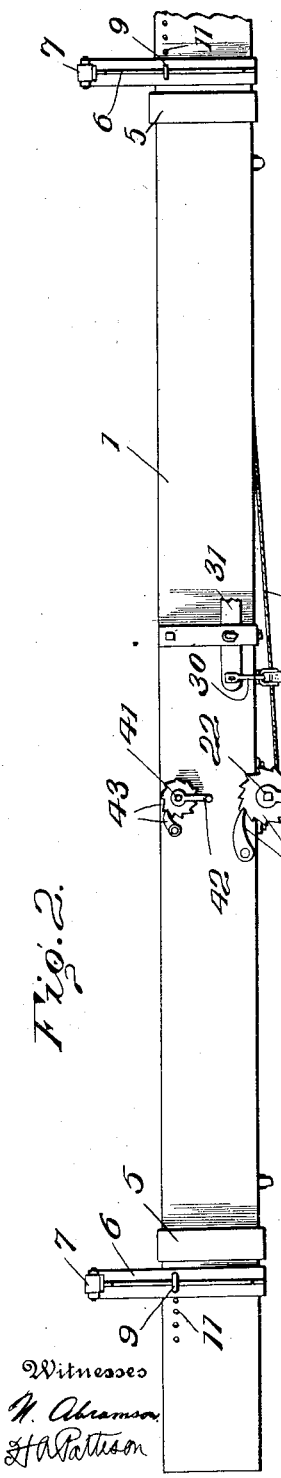
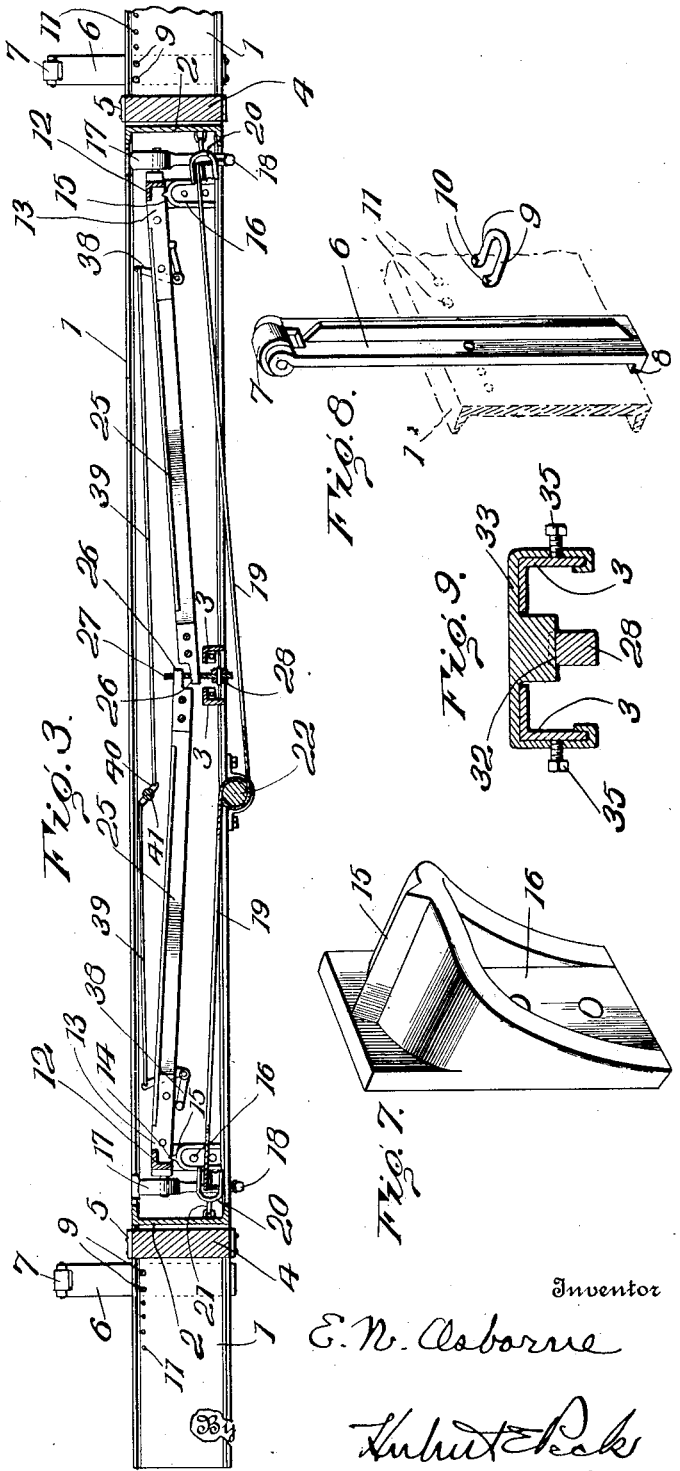

E. N. OSBORNE.
VEHICLE SCALE.
APPLICATION FILED APR. 26, 1913.
1,079,260.
Patented Nov. 18, 1913.
3 SHEETS—SHEET 3.
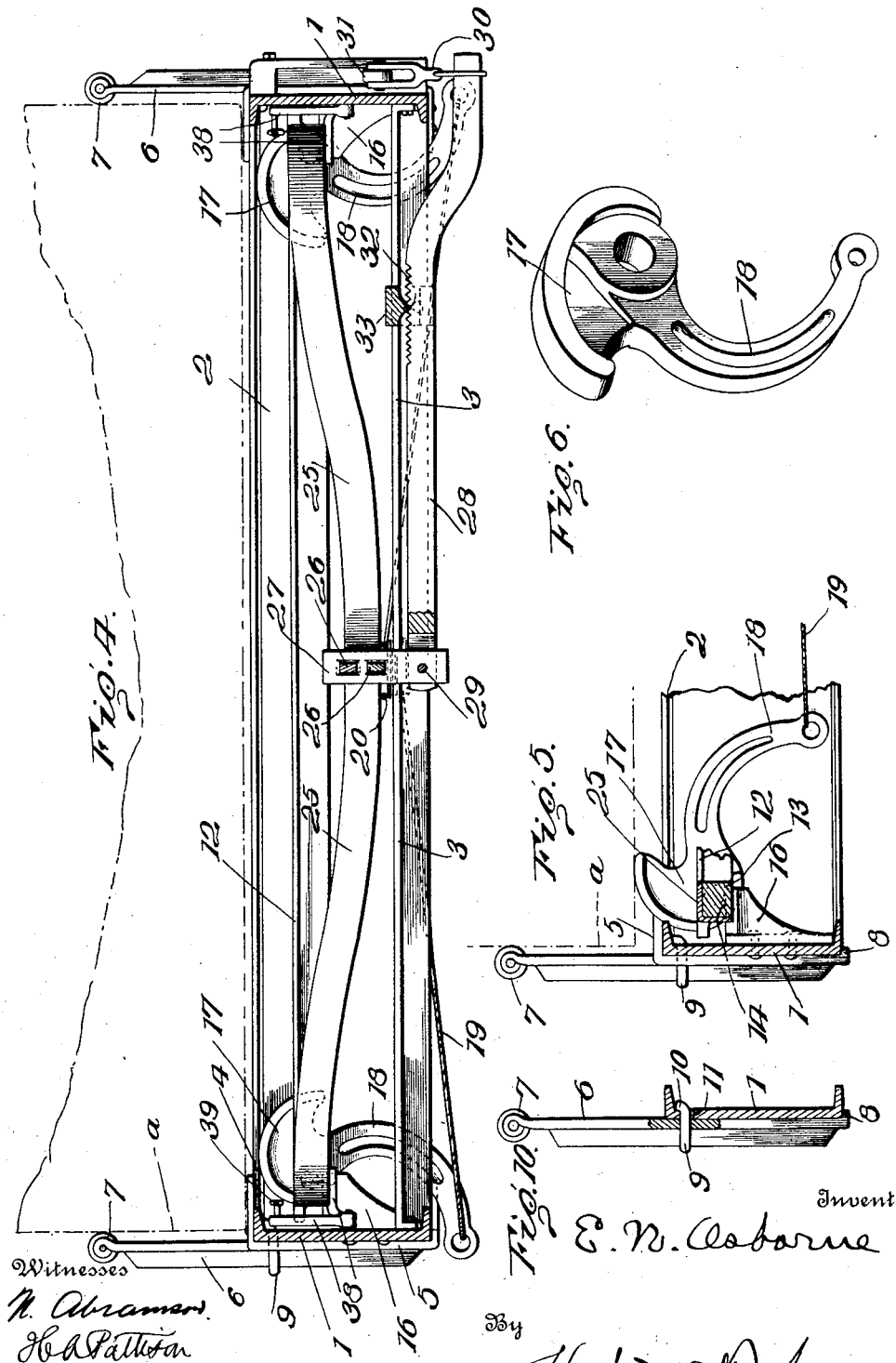

UNITED STATES PATENT OFFICE.

EBIN N. OSBORNE, OF DIXON, ILLINOIS.

VEHICLE-SCALE.

1,079,260.   Specification of Letters Patent.   Patented Nov. 18, 1913.

Application filed April 26, 1913. Serial No. 763,798.

*To all whom it may concern:*

Be it known that I, EBIN N. OSBORNE, a citizen of the United States, residing at Dixon, in the county of Lee and State of Illinois, have invented certain new and useful Improvements in Vehicle-Scales, of which the following is a specification.

This invention relates to certain improvements in vehicle scales; and the objects and nature of the invention will be readily understood by those skilled in the art in the light of the following explanation of the accompanying drawings illustrating what I now believe to be the preferred embodiments from among other formations, arrangements and structures within the spirit and scope of my invention.

It is an object of the invention to provide an improved vehicle scale carried by a frame independent of the vehicle body, box or hay rack and adapted to removably support such body, box or rack, without having the scale or operating parts thereof attached thereto whereby such body, box and rack can be readily applied to or lifted from said frame independently of the scale and without disturbing the operative condition thereof.

A further object of the invention is to provide certain improvements in details of construction, and in combinations and arrangements of parts whereby an improved and efficient car, wagon or other vehicle scale will be produced.

The invention consists in certain novel features in construction and in combinations and arrangements as more fully set forth hereinafter.

Referring to the accompanying drawings:—Figure 1, is a top plan view of the weighing apparatus and the supporting framework therefor, the vehicle running gear and body not being shown. Fig. 2, is a side elevation of the weighing apparatus of Fig. 1, some parts being broken away. Fig. 3, is a longitudinal vertical section of the apparatus of Fig. 1. Fig. 4, is a cross section taken in the plane of the line 4—4, Fig. 1. Fig. 5, is a section on the line 5—5, Fig. 1. Fig. 6, is a detail perspective of one of the vehicle body lifting cams. Fig. 7, is a detail perspective view of one of the bearing blocks or brackets. Fig. 8, is a detail perspective of one of the standards or stakes. Fig. 9, is a detail section taken on the line 9—9, Fig. 1. Fig. 10, is a detail vertical section more particularly illustrating the stake or standard securing devices, and whereby the same can be removed for adjustment.

In the example illustrated, I show weighing apparatus adapted to be secured to the running gear of a car, wagon, or any other suitable vehicle, and to receive and support the car, wagon or other vehicle body or load carrying element. This weighing apparatus is mounted on or in and is carried and supported by a suitable frame. This frame, in the particular example illustrated, consists of a pair of elongated parallel strong rigid channel bars or plates 1, forming the frame side beams or bars; a pair of parallel end cross bars 2, rigidly secured to and connecting said side beams and spaced inwardly suitable distances from the ends of said side bars; and a pair of adjacent parallel central or intermediate cross bars 3, rigidly secured to and connecting said side beams approximately at the central portion thereof.

The opposite end portions of the side beams 1, project suitable distances forwardly and rearwardly beyond the end cross bars 2, and these projecting ends are adapted to receive the bolsters whereby the weighing apparatus frame is secured or confined to the vehicle running gear, and to receive the standards or stakes whereby the vehicle body is confined to the frame of the weighing apparatus.

I show two bolsters 4, arranged at opposite ends of the frame and extending between said projecting ends thereof and adjustable longitudinally of said projecting ends. The bolster ends are formed to fit into the channels of the bars and slide longitudinally therein, and said bolster ends have loops 5, fixed thereto and transversely embracing said bars and slidable thereon with the bolsters.

I show four vertical standards or stakes 6, arranged at the four corners of the frame and projecting a suitable distance above the frame to confine the vehicle body against lateral displacement therefrom. These standards extend upwardly at the outer vertical sides of the vehicle body and said body is free to move vertically between the opposite side standards and hence I preferably provide the upper ends of the standards with anti-friction guide rollers 7, to bear against the sides of the vehicle body and prevent binding thereof and reduce the friction attendant on the vertical movement of said body during the weighing operation. These standards are preferably adjustable longitudinally on the beams 1, and are arranged thereon outwardly beyond the bolsters 4, to limit the outward movement of the bolsters longitudinally of said beams.

In the example illustrated, each standard vertically traverses the outer side of a beam and at its lower end is formed with a lip or flange 8, projecting under the beam and engaging the lower edge thereof. At an intermediate point in its length, the standard is provided with one or more rigid horizontal inwardly projecting pins 9, each at its inner end having a top stop or locking shoulder 10, and usually curved or rounded at the under side or corner of its inner end. Each pin, rigid with the standard, is adapted to pass inwardly through a perforation 11, in the beam and project through the beam immediately under the top flange thereof, with the inner end shoulder 10, of the pin engaging the inner face of the beam to hold the standard against outward movement from the beam.

The standards are in effect locked against detachment from the beams 1, by the vehicle body engaging the rollers 7, of the standards thereby holding the upper ends of the standards in vertical position and against inward and downward swing. When the vehicle body is not present between the opposite side standards, the upper ends of such standards can be swung inwardly over the weighing apparatus frame, on the pins 9, as fulcrums, thereby swinging the lower ends of the standards outwardly from the beams until the inner ends of the pins 9, have rocked out of the perforations 11, and thereby released the standards from the beams. The projected ends of the beams 1, are preferably formed with longitudinal series of perforations 11, to permit securing of the standards at various positions longitudinally of said beams so that the bolsters can be adjusted longitudinally.

The weighing apparatus is adapted to vehicles of various lengths, and I prefer to secure the frame of the weighing apparatus to the vehicle running gear through the medium of the bolsters 4, and hence it is desirable to provide means whereby said bolsters 4, can be adjusted longitudinally of said frame to accommodate various kinds of running gear and reach bar adjustments. I preferably bolt, clamp or otherwise secure the bolsters 4, to the bolsters of the vehicle running gear (not shown herein) or thereto through the medium of bolster springs so that the bolsters 4, virtually then constitute parts or extensions of the vehicle running gear bolsters.

The vehicle body (shown in dotted lines in Fig. 5, and indicated by reference character $a$,) is confined against lateral displacement by the opposite side standards 6, and normally rests on and is supported by the bolsters 4, (except during the weighing operation), and extends longitudinally of and above the top edges of the side beams 1.

The weighing apparatus comprises a pair of similar horizontally disposed levers 25 arranged within the frame 1, 4, and extending from its opposite end portions longitudinally thereof toward the center of said frame. The outer end of each lever is provided with a horizontal cross head 12, extending across the frame adjacent to but spaced inwardly from, the cross bar 2, at that end of the frame. The opposite ends of the cross head project into the channels of the side beams 1, and hence are arranged under the top longitudinal flanges of said beams which serve as stops limiting the upward movement of said head. The opposite ends of the head are provided with bearing blocks 13, rigidly secured thereto and projecting forwardly therefrom and forming portions of the lever. These blocks at their bottom faces, are formed with horizontal bearing sockets or V depressions 14, arranged longitudinally of said head to receive knife edge bearing or fulcrum edges 15, (arranged longitudinally of said head) formed on and rising from bearing or lever fulcrum brackets 16, rigidly fixed to the beams 1 in the channels thereof and projecting inwardly therefrom.

The outer ends of the blocks 13, forming rigid portions of the levers 25, form spindles or journals on which lifting cams 17, are mounted and supported to rock or swing in vertical planes parallel with the longitudinal axes of the lever cross heads. These lifting cams are formed with depending lever arms or shanks 18, to the free ends of which flexible pull connections 19, are secured. These connections extend transversely of the frame toward the longitudinal center line thereof and there pass through pulley blocks 20, having loose or swivel supporting connection 21 with the central portions of the end cross bars 2. Said pull connections extend from said pulley blocks 20 to a winding drum 22, arranged transversely of the central portion of the frame and mounted in the opposite side beams 1. At one end, this drum is provided with any suitable means for rotating the same and with a suitable pawl and ratchet mechanism 23, for holding the same against retrograde rotation. I show an exterior accessible hand crank or lever 24, for rotating said drum.

The longitudinal levers 25, constitute the main levers of the weighing apparatus and the vertically-movable inner or free ends 26 of said main levers are (in this particular instance) reduced and located one over the other approximately at the central portion of the frame, and are confined together by a vertical plate 27, arranged transversely thereof and having openings separately receiving said lever ends and providing knife edge bearings resting on the top edges of said lever ends. This pull connection or plate 27, depends from the lever ends 26, to the inner end of transverse lever 28, arranged between and parallel with the frame cross bars 3. The lower end of said plate is pivotally coupled to the inner end of said lever 28, by a transverse pivot 29, to transmit the upward pull of lever ends 26, directly to the inner end of the lever 28, and thereby operatively rock lever 28, with levers 25.

The outer end of lever 28 is deflected downwardly to pass outwardly below one of the frame sides 1, and at its outer extremity is suitably coupled by vertical pull connections 30, with the scale beam 31, usually arranged at the outer side of one of the frame sides 1. Any suitable scale beam, attachments and coöperating parts and graduations can be provided and hence I have not illustrated the same in detail.

A knife edge fulcrum bearing 32, is provided for the lever 28, and this bearing 32, transversely engages the top edge of said lever and is formed on the under side of a block 33, transversely overlying the frame cross bars 3, and adjustable longitudinally thereof to adjust the fulcrum bearing 32, longitudinally of lever 28, according to the weight of the load carried by the vehicle body.

Any suitable means can be provided for adjusting the fulcrum bearing 32, longitudinally of the lever 28, and holding the same in the desired adjustment, although in this instance, I show the block 33, slidable on the cross bars 3, and depending at the outer vertical edges thereof and turned in at the under edges thereof and provided with set screws 35, whereby the block can be clamped to said bars 3, when adjusted thereon to the desired position. When the weighing apparatus is in its normal inoperative position, the lifting cams 17, are depressed from operative lifting engagement with the vehicle body, and the inner free ends 26, of the main or longitudinal levers 25, are in their normal inoperative depressed positions. When the operator wishes to determine the weight of the load, consisting of the vehicle body and its contents, he operates the handle 24, to rotate the drum 22, in a direction to wind the flexible pull connections 19, thereon and thereby causes said connection to swing the lifting cams into operative lifting engagement with the four corners of the vehicle body bottom. As the lifting cams continue to swing, they will elevate the vehicle body from supporting engagement with the bolsters and frame and thereby throw the full weight thereof onto the cams and consequently onto the levers 25. The cams being located at the outer ends of the levers the weight of the vehicle body will cause the levers to rock on the fulcrums 15.

The weight of the load will depress the outer ends of the levers carrying the cams, and will elevate the inner ends 26, of the levers, and said ends 26, will elevate the inner end of the transverse lever 28, and hence depress the outer end thereof connected to the scale beam. When the weighing operation is completed, the pawl and ratchet mechanism 23, is adjusted to permit the winding drum to rotate to unwind the pull connections 19, so that the vehicle body can settle down to normal position on the bolsters, swinging the cams to normal inoperative depressed positions, with the operative elements of the weighing apparatus relieved of the load.

I preferably provide means to normally maintain the main or longitudinal balancing levers 25, lifted from their knife edge fulcrums 15, when the weighing apparatus is out of action and in normal position. For instance, I show two pairs of vertically swingable bell crank lifting levers 38, pivoted to the frame sides 1, between the upper and lower flanges thereof, and below the levers 25, and usually near the junctions between the diverging lengths of said levers and their cross heads. I connect the vertically-disposed arms of these levers through the medium of pull links 39, with short crank or lateral arms 40, rigid with rock shaft 41, extending across the frame and at its ends mounted in the frame sides 1. I provide one end of this shaft with a hand crank or lever 42, at the exterior of the frame and with pawl and ratchet mechanism 43, to hold the shaft against retrograde rotation. The horizontally-disposed arms of said levers 38, are arranged to engage the levers 25, near the cross heads thereof and lift said levers 25, from engagement with their fulcrums 15, and thus hold the levers elevated when the weighing apparatus is not in use for weighing purposes, and thereby avoid undue and unnecessary wear of the knife edges. The bell crank levers are rocked to thus lift levers 25, by rotating the shaft 41, and said parts can be held to hold the levers 25, elevated, by the pawl and ratchet mechanism.

When the weighing apparatus is to be used, the pawl and ratchet mechanism 43, can be adjusted to release the rock shaft 41, and permit the bell crank levers to drop from operative engagement with the levers 25, and thereby permit said levers 25, to drop onto their knife edge fulcrums. Various other mechanisms might be employed for maintaining the main weighing or balancing levers normally elevated from their fulcrums and I do not wish to limit myself to the particular means disclosed hereby as an example of devices that might be employed for this purpose.

The vehicle body is not secured to the weighing apparatus nor to the frame thereof and hence said body can be readily lifted from the frame and a different character of body (a hay or other rack for instance) can be placed on said frame.

The weighing apparatus is carried by and removable with its frame and said frame can be applied to various kinds of cars, for instance mine cars, and to various other kinds of vehicles.

While I show the winding drum and flexible pull connections for actuating the lifting cams yet I do not wish to limit all features of my invention to this particular mechanism for actuating the lifting cams.

In the particular example illustrated, I show two similar main or longitudinal balancing levers, each approximately of a triangular shape with a cross head at the fulcrum end and arms or rigid lengths fixed to the opposite ends of said head and converging therefrom and rigidly secured together at their approximately overlapping inner ends 26, although I do not wish to limit all features of my invention to main levers of this formation. It will be noted in this connection, that each lever has a pair of opposite side alined fulcrum points carried by the brackets 16, and that each lever has two opposite side lifting cams arranged adjacent to said fulcrum points.

It is evident that various changes might be resorted to in the forms, constructions and arrangements of the parts described without departing from the spirit and scope of my invention and hence I do not wish to limit myself to the exact disclosure hereof.

What I claim is:—

1. A vehicle scale comprising a scale-supporting frame consisting of side bars and cross bars, longitudinally arranged main levers carried by and fulcrumed in said frame to rock vertically, a scale beam carried by said frame and operatively connected with said main levers, normally-inactive vehicle-body lifting devices carried by said main levers, and actuating means for said devices and mounted in said frame.

2. In combination, a scale-supporting frame, bolsters carried by said frame and adjustable therein toward and from each other and adapted to removably receive and carry a vehicle body and permit vertical movement of the body from said bolsters independently of said frame, and vehicle-body weighing devices carried by and mounted in said frame, and normally in inoperative position with respect to said body and adapted to lift the same from said bolsters for weighing.

3. In combination, a scale-supporting frame, bolsters adjustable longitudinally thereof and adapted to receive a vehicle body vertically-movable with respect to said frame and bolsters and normally resting thereon and removable therefrom, scale levers mounted in and carried by said frame and normally inoperative with respect to said body, and body lifting means carried by said frame and separate from said body and adapted to elevate the same and throw the weight thereof onto said levers.

4. In combination, a scale-supporting frame, bolsters carrying the same and adjustable longitudinally thereof and adapted to receive a vehicle body vertically-movable with respect to said frame and bolsters and normally resting thereon and removable therefrom, and body weighing means carried by and mounted in said frame.

5. In combination, a scale-supporting frame, bolsters carrying the same and adjustable longitudinally thereof and adapted to receive a vehicle body vertically-movable with respect to said frame and bolsters and normally resting thereon and removable therefrom, and body weighing means mounted in and carried by said frame and disconnected from said body and normally in inoperative position with respect to said body and adapted to lift the same for weighing.

6. A vehicle scale comprising a scale supporting frame consisting of elongated side bars, and cross bars connecting said side bars, a vertically swingable scale beam, longitudinally-arranged vertically-rockable main levers fulcrumed in said frame, operative connections therefrom to said scale beam, and normally-inoperative vehicle-body lifting means separate from the vehicle body and adapted to lift the same from normal position and throw the weight thereof onto said main levers.

7. A vehicle scale comprising main levers, normally-inoperative vehicle-body-lifting devices mounted on and carried by said levers, and actuating means for said lifting devices.

8. A vehicle scale comprising main scale levers, vehicle-body-lifting cams fulcrumed on said levers, and actuating means for said cams.

9. A vehicle scale comprising weighing levers, vehicle-body-lifting levers fulcrumed on said weighing levers, and actuating devices for simultaneously swinging all of said lifting levers on the weighing levers to lift the vehicle body.

10. A vehicle scale comprising weighing levers, transversely swingable cam lifting levers carried thereby and fulcrumed thereon, a winding shaft, and pull cables from said shaft to said lifting levers to simultaneously swing the same to lift a vehicle body and throw the weight thereof onto said weighing levers.

11. A vehicle scale comprising a pair of vertically swingable weighing levers, vertically swingable cam lifting levers fulcrumed on and carried by said weighing levers and separate from and adapted to lie beneath the four corner portions of a vehicle body and to swing into lifting engagement therewith, and means for simultaneously swinging said lifting levers to elevate said body and throw the weight thereof onto said weighing levers.

12. Weighing apparatus comprising a frame, bolsters in said frame and adapted to support the same, said bolsters adapted to be secured to a vehicle running gear, and adapted to removably receive and support a vehicle body and permit vertical movement thereof independently of said frame and bolsters during the weighing operation, and vehicle body weighing devices carried by and arranged within said frame and adapted to be operated to lift said body and sustain the same for weighing, said weighing devices being normally in inoperative position with respect to said body.

13. Weighing apparatus of the character substantially as described, comprising a frame consisting essentially of side beams rigidly secured together, bolsters carried by and adjustable longitudinally of said side beams, vehicle body standards carried by and rising from said beams and limiting the outward movement of said bolsters and adjustable longitudinally of said beams to permit the outward adjustment of the bolsters, and weighing devices carried by and mounted in said frame.

14. Weighing apparatus of the character substantially as described, comprising a frame, longitudinally arranged main balancing levers, a scale beam, operative connections from said levers to the scale beam, said levers provided with vehicle body lifting means and operating connections therefor, and manually controlled mechanism for normally holding said levers in inoperative position elevated from their fulcrums.

15. In weighing apparatus of the character substantially as described, supporting means, a pair of horizontally disposed main balancing levers, supporting fulcrums therefor, said levers having cross heads at their outer end portions, wagon body lifting devices carried by the outer end portions of said levers, operating devices for said lifting devices, a transversely arranged lever, a pull connection between said lever and the inner ends of said main balancing levers, and a scale beam operatively connected with said transversely arranged lever.

16. In weighing apparatus of the character substantially as described, supporting means, a pair of horizontally disposed main balancing levers, means whereby a load can be thrown onto said levers, a transversely arranged lever provided with a fulcrum arranged transversely thereof and adjustable longitudinally thereof, an operative connection between said transverse lever and said main balancing levers, and a scale beam operatively connected with said transverse lever.

In testimony whereof I affix my signature in presence of two witnesses.

EBIN N. OSBORNE.

Witnesses:
CHARLES H. GILMORE.
JOHN C. REAGAN.

---

Copies of this patent may be obtained for five cents each, by addressing the "Commissioner of Patents, Washington, D. C."